US011620035B2

(12) United States Patent
Lam et al.

(10) Patent No.: US 11,620,035 B2
(45) Date of Patent: Apr. 4, 2023

(54) STREAMLINED HOSTED APPLICATIONS

(71) Applicant: Google LLC, Mountain View, CA (US)

(72) Inventors: Christopher Lam, Sydney (AU); Ben Frederick Wells, Cherrybrook (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/303,942

(22) Filed: Jun. 10, 2021

(65) Prior Publication Data

US 2021/0294468 A1    Sep. 23, 2021

Related U.S. Application Data

(63) Continuation of application No. 14/973,380, filed on Dec. 17, 2015, now abandoned.
(Continued)

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/04817* (2013.01);
(Continued)

(58) Field of Classification Search
CPC .... G06F 3/0483; G06F 16/95; G06F 16/9577; G06F 16/9562; G06F 40/103;
(Continued)

(56) References Cited

U.S. PATENT DOCUMENTS 5,818,446 A    10/1998  Bertram et al.
8,255,494 B1 *  8/2012  Boodman ............... H04L 67/42
                                          709/219
(Continued)

FOREIGN PATENT DOCUMENTS

WO    2016/100853 A1    6/2016

OTHER PUBLICATIONS

International Search Report and Written Opinion for PCT Patent Application No. PCT/US2015/066749, dated May 27, 2016, 16 pages.
(Continued)

*Primary Examiner* — Haoshian Shih
(74) *Attorney, Agent, or Firm* — Brake Hughes Bellermann LLP

(57) ABSTRACT

Presenting a web application includes receiving a user's selection of a UI element, which includes a visual icon representing the web application. In response to receiving the selection, the web application is launched in a browser window, where the browser is customizable to store bookmarks to webpages, and the browser can display multiple tabs of different webpages in a browser window. The browser window in which the web application is launched is tabless and includes chrome displaying back and forward buttons, where the buttons are selectable to navigate to a webpage in a history of webpages viewed by the user, and a reload button that is selectable to reload a webpage currently-viewed in the window. The chrome includes no UI elements that may be selected to store a bookmark to a webpage and includes no UI elements that display user-defined bookmarks to webpages.

21 Claims, 5 Drawing Sheets

Related U.S. Application Data

(60) Provisional application No. 62/094,045, filed on Dec. 18, 2014.

(51) Int. Cl.
*G06F 16/95* (2019.01)
*G06F 16/957* (2019.01)
*G06F 16/955* (2019.01)
*G06F 40/103* (2020.01)
*G06F 3/04817* (2022.01)
*G06F 3/0482* (2013.01)
*G06F 3/04842* (2022.01)
*H04L 67/02* (2022.01)

(52) U.S. Cl.
CPC .......... *G06F 3/04842* (2013.01); *G06F 16/95* (2019.01); *G06F 16/9562* (2019.01); *G06F 16/9577* (2019.01); *G06F 40/103* (2020.01); *H04L 67/02* (2013.01); *G06F 2203/04803* (2013.01)

(58) Field of Classification Search
CPC .............. G06F 3/04817; G06F 3/0482; G06F 3/04842; G06F 2203/04803; H04L 67/02
See application file for complete search history.

(56) References Cited

U.S. PATENT DOCUMENTS

| | | | |
|---|---|---|---|
| 2003/0112271 A1 | 6/2003 | Batalden et al. | |
| 2007/0277109 A1* | 11/2007 | Chen | G06F 8/20 715/733 |
| 2011/0307810 A1* | 12/2011 | Hilerio | G06F 3/0481 715/810 |
| 2012/0311050 A1* | 12/2012 | Lev | G06F 16/90 709/206 |
| 2013/0205187 A1* | 8/2013 | Hawkins | G06F 16/9558 715/208 |
| 2013/0268837 A1* | 10/2013 | Braithwaite | G06F 16/958 715/234 |
| 2014/0096042 A1 | 4/2014 | Travis | |
| 2014/0237020 A1 | 8/2014 | Schachtel et al. | |

OTHER PUBLICATIONS

"Customizing the Look of a Window Using JavaScript", retrieved on May 20, 2016 from <http://www.javascriptkit.com/javatutors/window2.shtml>, Jan. 31, 2014, 2 pages.

"Enable Full Restricted Mode in Internet Explorer Web Browser", retrieved on May 20, 2016 from <http://www.askvg.com/tip-enable-full-restricted-mode-in-internet-explorer-web-browser/>, Sep. 20, 2014, 4 pages.

"Open Method (Windows)", retrieved on May 19, 2016 from <https://msdn.microsoft.com/en-us/library/ms536651(v=VS.85).aspx>, May 23, 2013, 4 pages.

"Tutorial Introduction—Windows and JavaScript", retrieved on May 20, 2016 from <http://www.javascriptkit.com/javatutors/window1.shtml>, Jan. 31, 2014, 1 page.

"Window open() Method", retrieved on May 19, 2016 from <http://www.w3schools.com/jsref/met_win_open.asp>, Nov. 1, 2014, 3 pages.

Festa, "Microsoft Offers Tabbed Browsing—in IE 6", retrieved on May 19, 2016 from <http://www.cnet.com/news/microsoft-offers-tabbed-browsing-in-ie-6/>, Jun. 9, 2005, 5 pages.

Hoffman, "How to Sync Your Browser Data in Any Browser and Access it Anywhere", retrieved on May 20, 2016 from <http://www.howtogeek.com/139179/how-to-sync-your-browser-data-in-any-browser-and-access-it-anywhere/>, Apr. 3, 2013, 5 pages.

"Customizing the Look of a Window Using JavaScript—Example 3 Button (Example 2)", retrieved on May 20, 2016 from <https://web.archive.org/web/20140131002233/http://www.javascriptkit.com/page2.htm>, Jan. 31, 2014, 1 page.

U.S. Appl. No. 14/973,380, filed Dec. 17, 2015, Allowed.

* cited by examiner

STREAMLINED HOSTED APPLICATIONS

CROSS-REFERENCE TO RELATED APPLICATIONS

This application is a continuation of, and claims priority to, U.S. patent application Ser. No. 14/973,380, filed on Dec. 17, 2015, entitled "STREAMLINED HOSTED APPLICATIONS", which claims priority to U.S. Patent Application No. 62/094,045, filed on Dec. 18, 2014, entitled "LOW-CHROME HOSTED APPLICATIONS", the disclosures of which are incorporated by reference herein in their entirety.

FIELD

Embodiments relate to applications, in particular, to Streamlined Hosted Applications, that are executed within the context of a browser.

BACKGROUND

Generally, browser-executable web applications are either hosted by a network or remote server or installed on a client computing device. Installed applications generally can be granted more permissions to access local client-side resources than hosted applications. Hosted applications have the advantage of being flexible in that a change to the application can affect all users of the application. However, hosted applications often are not much more than a URL to an existing website and therefore the user experience of interacting with a hosted application may be disappointing when the appearance of the hosted application is indistinguishable from a typical website that displays content of the hosted application.

SUMMARY

Accordingly, in the below description example embodiments disclose mechanisms for providing web applications in which the web application is presented in a user interface that appears similar to an operating system level application.

In a general aspect, a method of presenting a web application includes receiving a user's selection of a user interface element displayed on a local computing device, where the user interface element includes a visual icon representing the web application. In response to receiving the user selection, the web application is launched in a window of a browser application, where the browser application is customizable to store bookmarks to webpages, and the browser has the ability to display multiple tabs of content of different webpages in a window of the browser. The window of the browser in which the web application is launched is tabless, and the window of the browser includes chrome displaying a back button and a forward button, where the buttons are selectable to navigate to a webpage in a history of webpages viewed by the user in the window, and a reload button that is selectable to reload a webpage currently-viewed in the window. The chrome includes no user interface elements that may be selected to store a bookmark to a webpage and includes no user interface elements that display user-defined bookmarks to webpages.

Implementations can include one or more of the following features, alone or in combination with one or more other features. For example, the chrome can include a visual icon representing the web application. In response to receiving the user selection, an icon for, and the name of, the web application can be displayed, in an application task manager of an operating system of the computing device. In response to receiving the user selection, an icon for, and the name of, the browser can be displayed in the application task manager, where the icon for the browser is different from the icon for the web application.

The web application can be opened in a tab of a tabbed window of the browser application, a user indication to create the user interface element including the visual icon representing the web application can be received, and the user interface element including the visual icon representing the web application can be stored on a desktop, a start menu, or a taskbar of the computing device. Generating the visual icon representing the web application can be based on content of the web application opened in the tab of the tabbed window of the browser application. Generating the visual icon can include selecting one of a plurality of visual icons provided by the web application opened in the tab of the tabbed window, where the selected visual icon is selected based on the location at which the user interface element is stored.

User login credentials can be transmitted from the computing device to a server, where the credentials authenticate the user of the computing device to the server computer system and, in response to receiving an acknowledgment of a successful authentication of the user to the server computer system, information about the stored user interface element representing the web application can be transmitted to the server computer system for synchronization from the server computer system to another local computing device from which credentials authenticating the user of the other local computing device are successfully transmitted to the server computing system.

The chrome can display a home button that is selectable to cause a homepage of the web application to be displayed within the tabless window of the browser.

In another general aspect, a system for presenting a web application includes a non-transient computer-readable storage medium storing executable instructions and at least one semiconductor-based processor configured for executing the executable instructions. The execution of the instructions causes the system to receive a user's selection of a user interface element displayed on a local computing device, where the user interface element includes a visual icon representing the web application. In response to receiving the user selection, the web application is launched in a window of a browser application, where the browser application is customizable to store bookmarks to webpages has the ability to display multiple tabs of content of different webpages in a window of the browser. The window of the browser in which the web application is launched is tabless and includes chrome displaying a back button and a forward button, which are selectable to navigate to webpage in a history of webpages viewed by the user, the history including the web application, and a reload button that is selectable to reload the web application. The chrome includes no user interface elements that may be selected to store a bookmark to a webpage.

Implementations can include one or more of the following features, alone or in combination with one or more other features. For example, the chrome can include a visual icon representing the web application. Execution of the instructions can also cause the system to, in response to receiving the user selection, display, in an application task manager of an operating system of the computing device, an icon for, and the name of, the web application. Execution of the instructions can also cause the system to, in response to receiving the user selection, display, in the application task manager an icon for, and the name of, the browser, wherein the icon for the browser is different from the icon for the web. Execution of the instructions can also cause the system to, open the web application in a tab of a tabbed window of the browser application, receive a user indication to create the user interface element including the visual icon representing the web application, and store the user interface element including the visual icon representing the web application on a desktop, a start menu, or a taskbar of the computing device.

Execution of the instructions can also cause the system to generate the visual icon representing the web application based on content of the web application opened in the tab of the tabbed window of the browser application. Generating the visual icon can include selecting one of a plurality of visual icons provided by the web application opened in the tab of the tabbed window, where the selected visual icon can be selected based on the location at which the user interface element is stored. Execution of the instructions can also cause the system to transmit user login credentials from the computing device to a server, the credentials authenticating the user of the computing device to the server computer system and, in response to receiving an acknowledgment of a successful authentication of the user to the server computer system, transmit information about the stored user interface element representing the web application to the computer system for synchronization from the server computer system to another local computing device from which credentials authenticating the user of the other local computing device are successfully transmitted to the server computing system.

The chrome can also display a home button that is selectable to cause a homepage of the web application to be displayed within the tabless window of the browser.

DETAILED DESCRIPTION OF THE EMBODIMENTS

Figure 1:
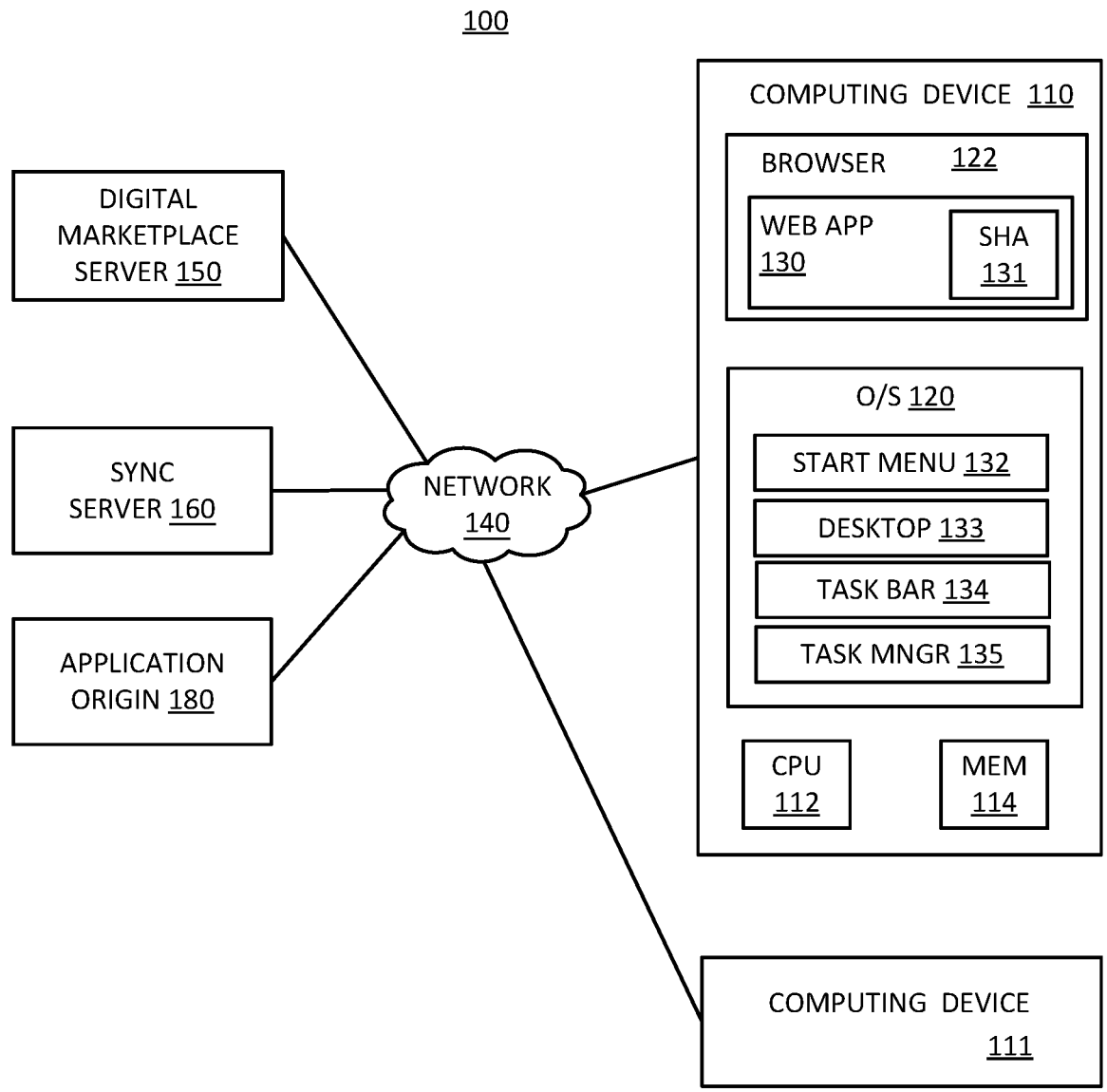
FIG. 1 is a schematic block diagram of a system according to at least one example embodiment.

A web browser executed by a client computing device can receive code (e.g., web-technology programming code) from a remote server (e.g., a remote server that hosts a website) and can execute the received code on the client device for the benefit of a user of the client device.

In various implementations, the web browser may include or have installed one or more applications that may be configured to perform tasks for a user. In such an implementation, the application may be configured to be executed or interpreted by the web browser. In general, a browser-executable application is a program that is written in web-technology programming code, i.e., code that is used for programming Internet-available resources and that is executable on the client computing device without compilation. Web-technology programming code is designed to be run entirely within a web browser on the client computing device and includes, for example, markup language code (e.g., HTML5), JavaScript, and CSS. The browser-executable application contains all of the resources necessary to execute the application on the client computing device and the code needed to execute the application by the client computing device is not dynamically generated. Examples of web applications include games, photo editors, and video players that are run inside the browser.

Web applications can include "hosted web applications," and "packaged applications."

Hosted applications may include at least a portion of a website that itself includes webpages, plus some metadata that may be especially pertinent to the web application or to the user of the web application to allow the web application to perform some particular functionality for the user. Hosted web applications can be run online, e.g., hosted applications are hosted by an online server that executes the application and serves content to the client computing device through the network for presentation to the user through a browser application. In some implementations, hosted web applications can be granted, additional permissions to use local resources of a client computing device, beyond what typical code executed by a browser is permitted to use (e.g., the ability to read content from a local clipboard or the ability to always have a hidden page open which is performing tasks such as synchronizing data for offline use or receiving server-pushed notifications to display to the user). In some implementations, notice of the additional permissions must be provided to the user and the user must explicitly grant the permissions, so that the user is aware of the additional permissions and may determine whether they should be granted in exchange for running the hosted app. Launching the hosted application implicitly grants the permissions requested by the application for all pages whose URLs match those that are listed in the manifest for the application. Then, the application is able to use the features that are enabled by the granted permissions without having to repeatedly ask the user for permission to use the features.

Packaged applications can be thought of as web applications whose code is bundled, so that the user can download all of the content of the web application for execution by the browser or in a standalone window. A packaged application may not need to have network access to perform its functionality for the user, and rather may be executed successfully by the browser locally on the computing device without access to a network.

Packaged applications have the option of using extension application programming interfaces (APIs), allowing packaged apps to change the way the browser behaves or looks. In some cases, a packaged application may operate without appearing to run in a browser, e.g., without the browser "chrome" (i.e., UI elements around the webpage or app content displayed in the browser window), tabs, or other user interface of the browser. In such a case, the packaged application could operate in a standalone window without access to content scripts or APIs related to browser state such as cookies, history, bookmarks, open tabs, etc. In various cases, packaged applications may access USB drives, BLUETOOTH devices, open raw network sockets, act as servers, or access the local filesystem, as examples.

Packaged applications may look and feel like native applications, with a big-screen design and rich user interface. Packaged applications may bundle all their files into a single file (e.g., a zip file, such as a .CRX file) that a user downloads and then installs the content of. This bundling means that, unlike hosted applications, packaged applications do not need to depend on content from the web.

Applications may be distributed via a trusted web store, or via individual websites, as examples.

In some implementations, the API (and/or web API)) may be an element of a web browser as discussed above. However, in some implementations, the API (and/or web API)) may be an element of a web based operating system (Browser-OS). A Browser-OS may be a bootable version of a web browser (including a browser, a media player and a file system). The Browser-OS may store all of a user's applications and data on the Web, as opposed to a local hard drive. The Browser-OS (e.g., Chrome-OS®) may replace a traditional operating system.

Like hosted applications, packaged apps also can be granted additional permissions to use local resources of a client computing device, beyond what typical code executed by a browser is permitted to use. In some implementations, packaged apps may be granted additional permissions that provide more access to local resources of a client computing device than a hosted application is permitted to use. With a packaged application, a user may be comfortable with downloading and installing the application and giving the packaged application a high level of access to the computing device because the packaged application has gone through a verification and validation process before the packaged application listed in a digital marketplace and the app is trusted not to change after it is downloaded and installed on the client computing device. Therefore, the user trusts that the downloaded code will not be malicious, even though the code has been given a high level of access to the computing device.

By contrast, a hosted web application, even if the application has been approved in the digital marketplace, is essentially nothing more than a URL to a website. In some implementations, a hosted application may also include some metadata that defines some permissions that provide more access to local resources of the client computing device, but because the code at the website pointed to by the URL can change, users should be reluctant to grant a high level of access to the computing device to a hosted web application because the code may become malicious even if the code had been previously approved. Thus, hosted applications generally present similar, or identical, content as the website identified by the URL of the hosted application.

To distinguish the presentation of a hosted application from a normal website a hosted application can be presented as a "Low-chrome hosted application" in a user interface that appears more like that of a standalone native application or that of a packaged application and less like that of a website in a regular browser window. For example, much of the browser chrome can be omitted when displaying a low-chrome hosted application to give the low-chrome hosted application the appearance of a native application or a packaged application. In addition, low-chrome hosted applications can be pinned to a task bar, a desktop, and/or a start menu of a client computing device, and they can be launched from their pinned location(s), which, again, gives low-chrome hosted applications may feel closer to native and packaged applications then to typical hosted applications.

FIG. 1 is a block diagram of a system 100 that may be used to implement low-chrome hosted applications using the techniques described herein. The depiction of system 100 in FIG. 1 is shown by way of example. It will be appreciated that other configurations may be used for implementing such techniques.

The system 100 includes client computing devices 110, 111. Devices 110 and 111 include similar components, and only the components of device 110 are described in detail. The client computing device 110 may take the form of a number of different devices, such as a personal computer, a television, laptop computer, tablet computer, netbook computer, or a web-enabled phone, as examples. The device 110 includes one or more processors 112 that can execute instructions stored on one or more memory devices 114, an operating system 120 and a browser 122 that may be used to access various types of content. Such content may include websites, photos, video, audio and executable scripts, for example. The operating system 120 can include typical features of an operating system, such as, for example, a start menu 132, a desktop 133, and a taskbar 134 for displaying applications and documents that can be executed on the computing system, and a task manager 135 for displaying information about applications and processes being executed by the computing system.

As shown in FIG. 1, browser 122 can execute a hosted web application (e.g., a website) 130. In some implementations, the web application can be executed as a low-chrome hosted application 131, which may be executed on the computing device 110 using the techniques described herein. The low-chrome hosted application 131 may include respective client-side components of the application. Depending on the particular implementation, the low-chrome hosted application 131 may include a description of the application and/or code that is executable by the browser 122, where that code provides functionality for the web application.

In the system 100, the computing device 110 is coupled with a network 140. The network 140 may include a data access network that provides access to the Internet and/or the World Wide Web. Via the network 140, computing device 110 (using browser 122, for example) may communicate with a digital marketplace server 150 (e.g., an application server or web store), an application origin 180, and a synchronization server 160. In this example, the application origin 180 may include server-side components for the application 130. The application 130 and the low-chrome hosted application 131 may operate using multiple origins.

Code for executing the low-chrome hosted application 131 can be downloaded from the digital marketplace server 150 or from the application origin 180 to the client computing device 110. In some implementations, code for executing the low-chrome hosted application 131 can be downloaded from an application origin 180 (e.g., a website identified by a URL associated with the low-chrome hosted application). In one implementation, the digital marketplace server 150 may be configured to receive requests from user computing devices (such as the computing device 110) for installation of a low-chrome hosted application 131, and to provide to the client computing device 110, in response to such requests, code for executing the low-chrome hosted application 131, including a URL associated with the low-chrome hosted application 131.

In the arrangement shown in FIG. 1, browser 122 may be used to request hosted applications 130 from the digital marketplace server 150. For example, the digital marketplace 150 may implement a website that is used to distribute web applications, among other content. As an example, the digital marketplace server 150 may implement an e-commerce site.

Hosted applications 130 can be downloaded and executed by the computing system 110, for example, by the browser 122. Hosted applications 130 can be executed by a typical instance of a browser application, where the browser application can be customized to store bookmarks to webpages and hosted applications and where the browser application can display multiple tabs of different content. In some implementations, a user may indicate that a particular web application 130 (e.g., a webpage) should be executed by the browser as a low-chrome hosted application 131 to provide a streamlined user interface for the particular web application in which the instance of the browser executing the low-chrome hosted application 131 does not display any tabs and includes only a limited amount of chrome around the content of the low-chrome hosted application. Thus, the web application executed as a low-chrome hosted application 131 appears more like a native application.

A user may provide this indication to present a hosted application as a low-chrome hosted application 131 by interacting with a user interface element present on the content of the web application 131 by interacting with a user interface element associated with the browser executing the web application 130. In response to this indication, information may be stored in association with the browser 122 to indicate that the particular webpage should be executed and presented as a low-chrome hosted application 131. Furthermore, in response to this indication, an icon representing the low-chrome hosted application may be displayed in a location typically reserved for native applications, such as, for example, on the start menu 132, on the desktop 133, on the taskbar 134, etc., and selection of the icon may cause the particular webpage to be launched and presented as a low-chrome hosted application 131 by the browser 122. When the particular application is launched and presented as a low-chrome hosted application 131, the low-chrome hosted application may be listed in the list of applications or processes of the task manager 135 of the operating system 120. For example, an icon and the name of the low-chrome hosted application 131 can be presented in the task manager 135. The icon and the name of the low-chrome hosted application 131 can be presented in the task manager separately from the icon and the name of the browser application 122, which, again, suggests to the user that the low-chrome hosted application is more than just a website.

The system 100 can also include a sync server 160 that can store unique identifiers to enable syncing between various user sessions on different client computing devices e.g., computing device 110, 111. For example, in some implementations, a user account allows a user to authenticate to system services (e.g., applications) and receive authorization to access them. To log into a user account, a user may authenticate herself with a password or other credentials for the purposes of accounting, security, and resource management. Once the user has logged on (e.g., to a web browser, to a computing device, etc.), an operating system may use an identifier to refer to the user, rather than a username. In some implementations, when a user signs into a web browser or a certain device, all of the user's bookmarks, extensions, browser-executable applications, theme, other browser preferences and/or settings may be loaded from a sync server 160 via a network 140. Accordingly, the user's low-chrome hosted applications, along with the user's bookmarks, extensions, theme, and other browser preferences and/or settings, may be saved at the sync server 160 and synced to a user's account. The user can then access this synced information anytime the user signs into the web browser on other computers and devices.

In the example of FIG. 1, the computing device 110, server 150 and/or sync server 160 are understood to represent virtually any computing system configured to perform the techniques described herein. As such, the computing device 110, server 150 and/or sync server 160 may be understood to include various components which may be utilized to implement the techniques described herein, or different or future versions thereof. By way of example, the computing device server 150 and/or sync server 160 are illustrated as including the at least one processor 112 as well as the at least one memory 114 (e.g., a non-transitory computer readable storage medium) respectively. The processor 112 may be formed on a substrate and may be utilized to execute instructions stored on the memory 114 to thereby implement the various features and functions described herein, or additional or alternative features and functions.

Figure 2:
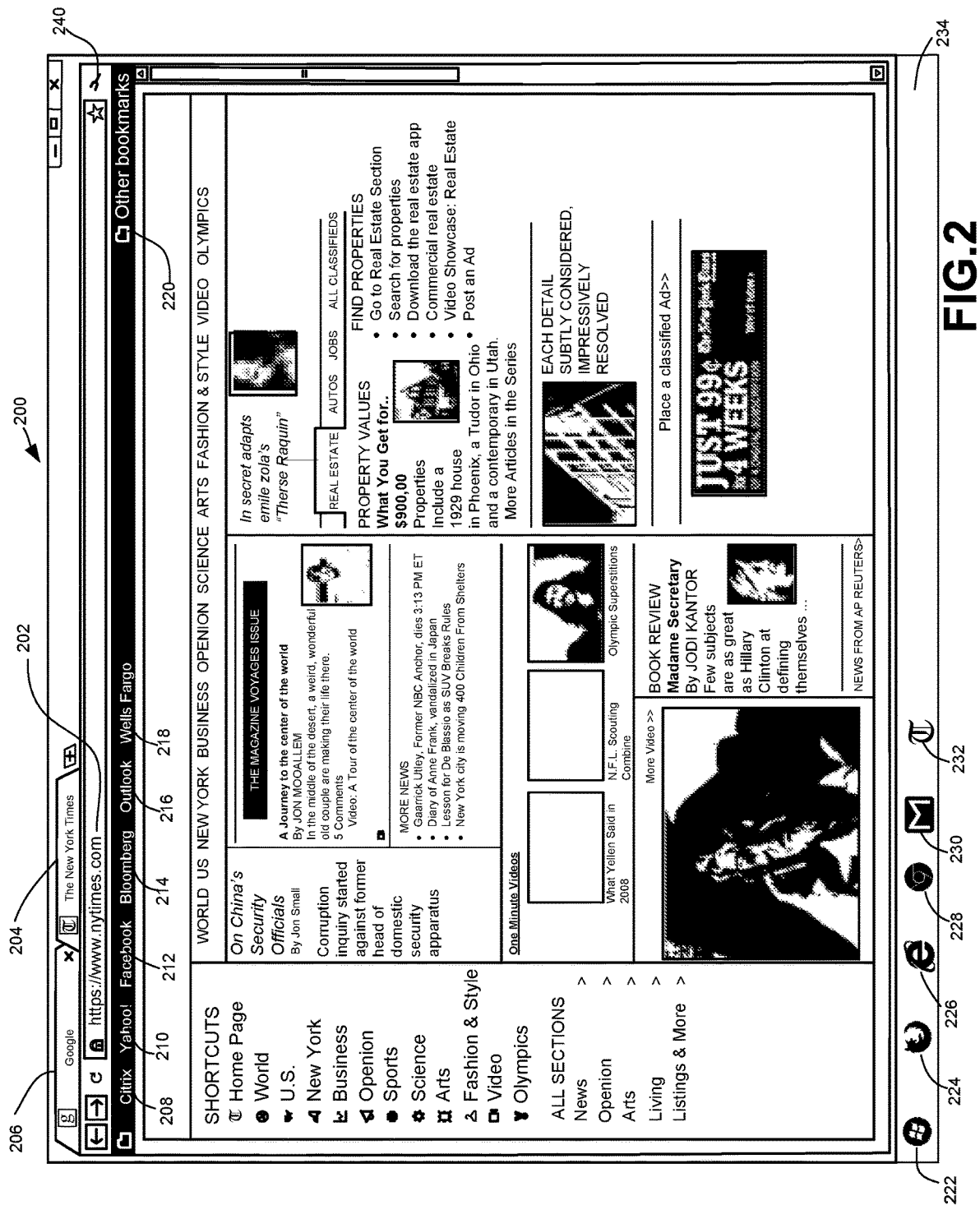
FIG. 2 is a screenshot of a presentation of a hosted application (e.g., a webpage) by a browser application.

FIG. 2 is a screenshot 200 of a presentation of a hosted application 130 (e.g., a webpage) by a browser application. The presentation of the hosted application includes content of the application displayed in a main window of the browser, which is framed by chrome of the browser application. The hosted application 130 is identified by a URL 202 displayed a location bar of the chrome, and by a name and icon associated with the hosted application, which are displayed in a tab 204 of the chrome. Other tabs 206 also can be displayed in the chrome, and selection of another tab 206 can cause content of a hosted application associated with the other tab 206 to be displayed in the main window of the browser. The chrome also can include a display of one or more bookmarks 208, 210, 212, 214, 216, 218 to other hosted applications/webpages, and selection of a bookmark may cause the content associated with the bookmark to be displayed in the main window of the browser. An icon 220 identifying a folder that stores additional bookmarks also can be displayed in the chrome of the browser.

Below the chrome of the browser, an icon 222 identifying a start menu provided by the operating system of the computing device can be displayed. The selection of the start menu icon 222 can cause the display of a menu of applications that may be executed by the client computing device. Also below the chrome of the browser, icons 224, 226, 228, 230, 232 can be displayed in a taskbar 234, where the icons in the taskbar identify applications that can be launched as a result of a selection of the icon. Icons 224, 226 and 230 identify natively-executed applications. Icon 232 identifies a low-chrome hosted application that can be launched through selection of the icon 232 displayed in the taskbar. The low-chrome hosted application 131 associated with the icon 232 corresponds to the hosted application 130 presented in the screenshot of FIG. 2. Icons, similar to icon 232, for launching a low-chrome hosted application 131 can be created and displayed in other areas controlled by the operating system that typically are reserved for natively-executed applications. For example, an icon for a low-chrome hosted application 131 can be created and displayed in the start menu 132, 222 are on the desktop 133.

To create an icon 232 for launching a low-chrome hosted application, a user interacting with a hosted application 130 displayed in a tabbed browser (e.g., as shown in FIG. 2) can select a user interface element within the chrome of the tabbed browser and then provide an indication that a low-chrome hosted application should be created for the currently displayed webpage and that an icon for the low-chrome hosted application corresponding to the currently displayed webpage should be created and stored on the computing device. For example, a user may select a settings user interface element 240 (e.g., a wrench icon, a gear icon, etc.), which may then present a menu of options for creating one or more icons for the low-chrome hosted application to be created and stored in one or more locations on the computing device. When a user creates a low-chrome hosted application 131 and one or more icons used for launching the low-chrome hosted application, information may be stored in the browser to indicate that when the low-chrome hosted application is launched by interacting with one or more of the created icons, that the content of the application should be launched and presented by the browser in the low-chrome hosted application mode.

Figure 3:
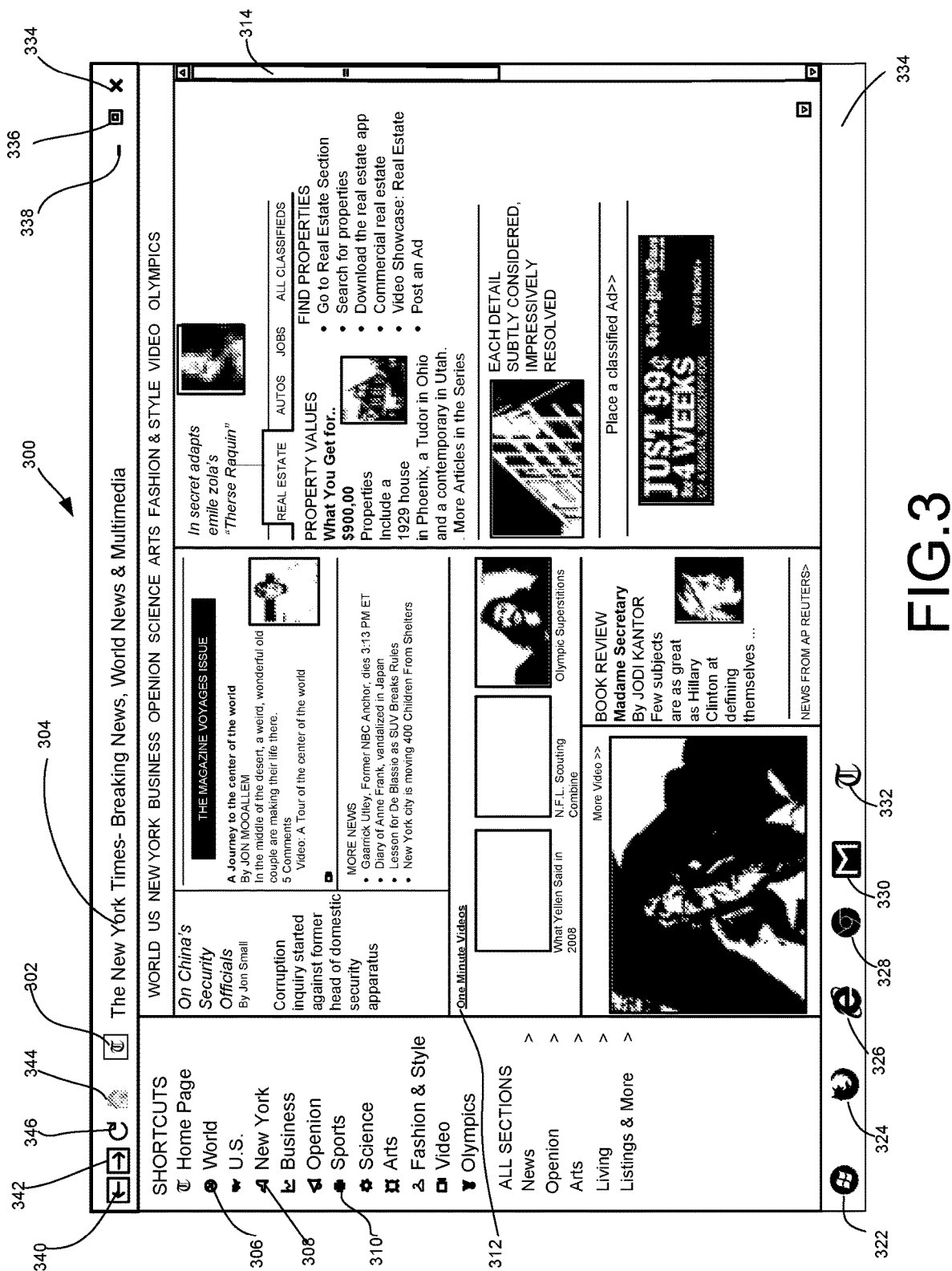
FIG. 3 is a screenshot of a presentation of a streamlined hosted application by a browser application.

FIG. 3 is a screenshot 300 of a presentation of a low-chrome hosted application 131 by a browser application. The presentation of the low-chrome hosted application 131 includes content of the application displayed in a main window of the browser, which is framed by a limited amount of chrome of the browser application. The low-chrome hosted application 131 is identified by a URL that is stored in association with an icon used to launch the low-chrome hosted application, but the URL is not displayed in a location bar of the chrome of the browser. In some implementations, the chrome of the browser used to display the low-chrome hosted application 131 cannot ever display the URL for the low-chrome hosted application. In some implementations, the chrome of the browser used to display the low-chrome hosted application 131 displays a name 302 and an icon 304 associated with the low-chrome hosted application, where the name 302 and the icon 304 are provided by the content of the low-chrome hosted application.

The browser interface used to display the low-chrome hosted application is tabless, in that the chrome of the browser interface does not display any tabs for content other than the low-chrome hosted application. In addition, the chrome of the browser interface for the low-chrome hosted application 131 does not display any user-created bookmarks, the selection of which may cause the content associated with the bookmark to be displayed in the main window of the browser. In some implementations, when the browser displays the low-chrome hosted application 131 and its limited chrome mode, the user may be prohibited from adjusting any setting of the browser to display another tab or to display a bookmark.

As with the typical browser interface shown in FIG. 2, when displaying a low-chrome hosted application 131 by a browser in the limited-chrome mode associated with the low-chrome hosted application, an icon 322 identifying a start menu provided by the operating system of the computing device can be displayed below the chrome of the browser. The selection of the start menu icon 322 can cause the display of a menu of applications that may be executed by the client computing device. Also below the chrome of the browser used to display the low-chrome hosted application 131, icons 324, 326, 328, 330, 332 can be displayed in a taskbar 334, where the icons in the taskbar identify applications that can be launched as a result of a selection of the icon. Icons 324, 326 and 330 identify natively-executed applications. Icon 332 identifies a low-chrome hosted application that can be launched through selection of the icon 332 displayed in the taskbar.

The content of the low-chrome hosted application 131 displayed in the main window of the browser can include hyperlinks 306, 308, 310, 312 can be selected to cause the browser to display content associated with the selected hyperlink in the low-chrome hosted application user interface. The hyperlinks are associated with URLs, which, in turn, are associated with the content to be displayed. Thus, the low-chrome hosted application user interface can display content other than the content associated with the icon for the low-chrome hosted application, however, in some implementations, the content displayed in the low-chrome hosted application is reachable only by navigating through hyperlinked content within the low-chrome hosted application itself. The chrome of the browser used to present the low-chrome hosted application can include a back button 340 and a forward button 342 that can be selected to load content from a sequential list of accessed content displayed in the low-chrome hosted application, where the back button 340 is used to access content one step in one direction of the sequential list and the forward button 342 is used to access content one step in an opposite direction of the sequential list.

The chrome of the browser used to present the low-chrome hosted application also can include a home button 344 that can be selected to display content specified by the URL associated with the icon used to launch the low-chrome hosted application. The chrome of the browser used to present the low-chrome hosted application also can include a reload button 346 that can be used to reload content of the currently displayed page of the low-chrome hosted application. In addition, the chrome of the browser used to present the low-chrome hosted application can display a user interface element 334 that can be selected to close the application 131, a user interface element 336 that can be used to reduce the size of the window used to display the application and a user interface element 338 that can be selected to minimize the window. The chrome of the browser used to present the low-chrome hosted application 131 also can include a vertical scroll bar 314 and a horizontal scrollbar (not shown) that can be used to through content of the low-chrome hosted application displayed in the browser window.

Figure 4:
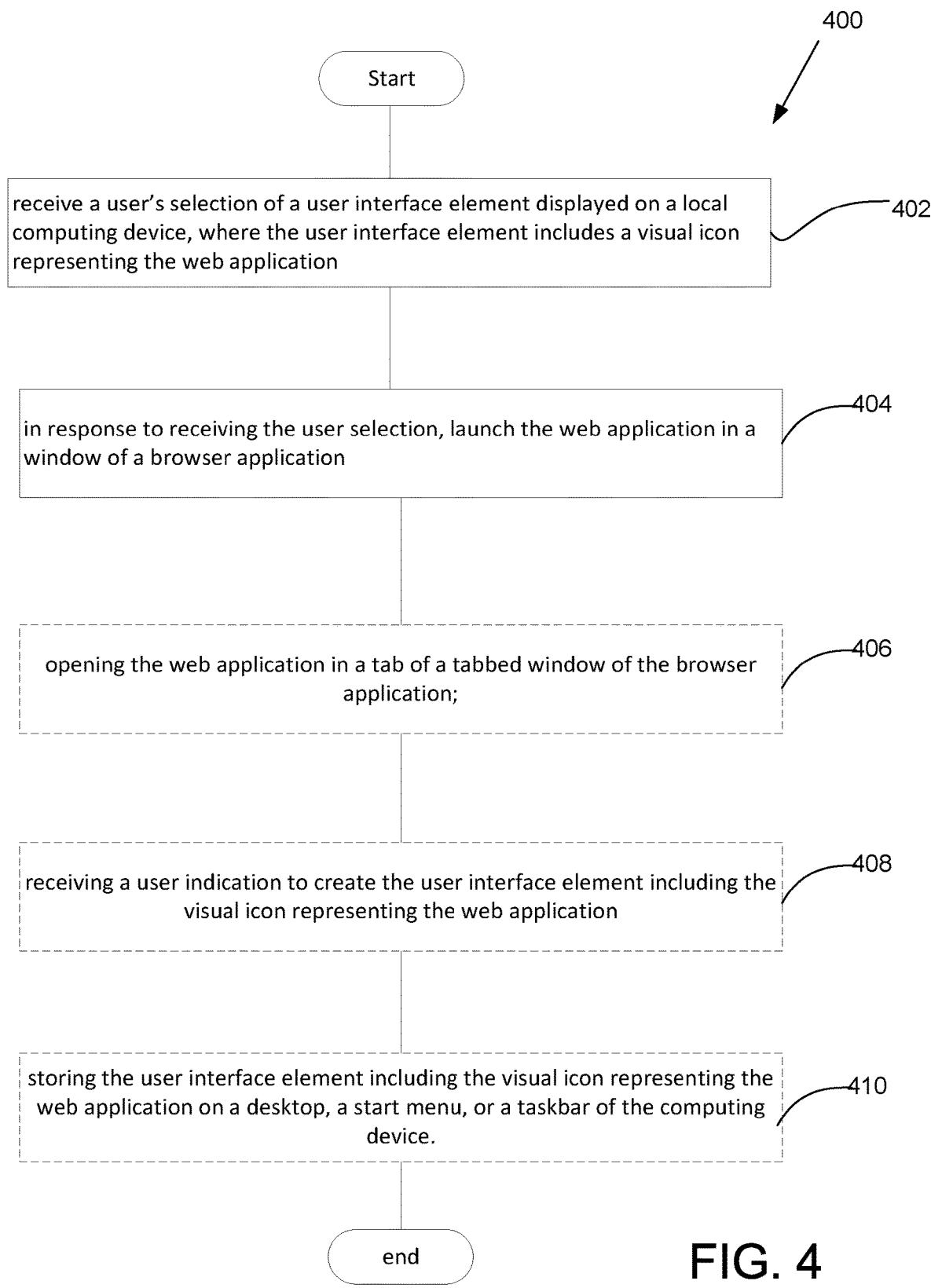
FIG. 4 is a flowchart of a process of presenting a web application.

FIG. 4 is a flowchart of a process 400 of presenting a web application, according to example embodiments. The steps described with regard to FIG. 4 may be performed due to the execution of software code stored in a memory (e.g., memory 114) associated with an apparatus (e.g., as shown in FIG. 1) and executed by at least one processor (e.g., at least one processor 112) associated with the apparatus. However, alternative embodiments are contemplated such as a system embodied as a special purpose processor. Although the steps described below are described as being executed by a processor, the steps are not necessarily executed by a single processor. In other words, at least one processor may execute the steps described below with regard to FIG. 4.

After the process 400 of presenting a web application starts, a user's selection of a user interface element displayed on a local computing device is received, where the user interface element include a visual icon representing the web application (402). In response to receiving the user selection, the web application is launched in a window of a browser application (404). The browser application is customizable to store bookmarks to webpages, and the browser having the ability to display multiple tabs of content of different webpages in a window of the browser, but the window of the browser in which the web application is launched is tabless. The window of the browser in which the web application is launched includes chrome displaying a back button and a forward button, the buttons being selectable to navigate to webpage in a history of webpages viewed by the user. The chrome includes a reload button being selectable to reload the web application, but the chrome include no user interface elements that may be selected to store a bookmark to a webpage and the chrome includes no user interface elements that display user-defined bookmarks to webpages.

In some implementations, the web application can be opened in a tab of a tabbed window of the browser application (406). A user indication to create the user interface element including the visual icon representing the web application can be received (408). Then, the user interface element including the visual icon representing the web application can be stored on a desktop, a start menu, or a taskbar of the computing device (410).

As will be appreciated, the techniques and systems described herein may be implemented as an element of and/or an extension of the generic computer device 500 and/or the generic mobile computer device 550 described below with regard to FIG. 5. Alternatively, or in addition to, the system 200 illustrated in FIG. 2 may be implemented in a separate system from the generic computer device 500 and/or the generic mobile computer device 550 having some or all of the features described below with regard to the generic computer device 500 and/or the generic mobile computer device 550.

As will be appreciated, the system 200 (and/or elements thereof) illustrated in FIG. 2 may be implemented as an element of and/or an extension of the generic computer device 500 and/or the generic mobile computer device 550 described below with regard to FIG. 5. Alternatively, or in addition to, the system 200 illustrated in FIG. 2 may be implemented in a separate system from the generic computer device 500 and/or the generic mobile computer device 550 having some or all of the features described below with regard to the generic computer device 500 and/or the generic mobile computer device 550.

Figure 5:
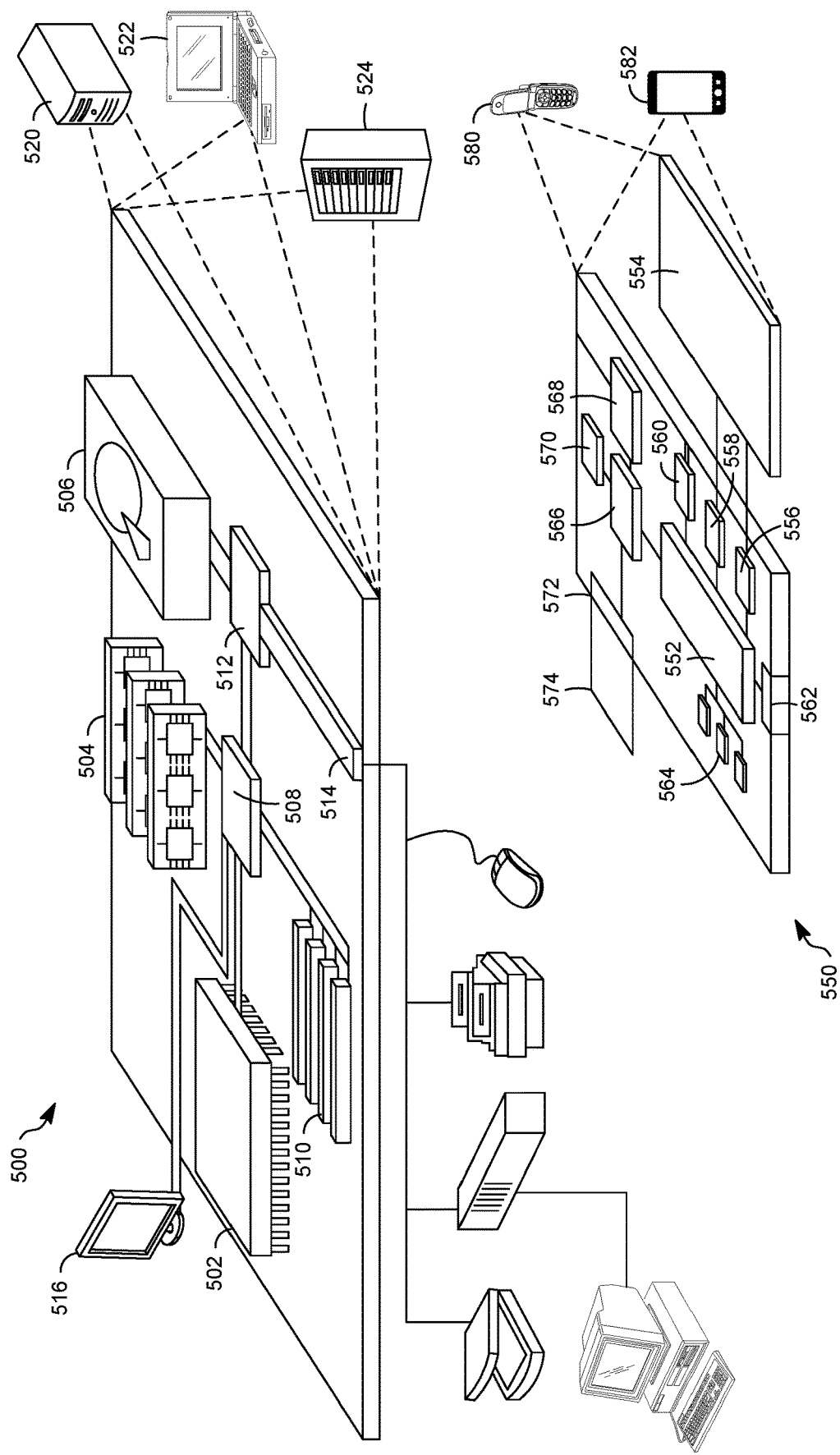
FIG. 5 is a schematic block diagram of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, LTE, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium and/or a non-transitory computer-readable storage medium. A processor(s) (e.g., a processor formed on a silicon or GaAs substrate) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether that particular combination has been specifically enumerated in the accompanying claims at this time.

What is claimed is:

1. A method comprising:
opening a tabbed main window of a browser on a computing device, wherein the browser is configured to store a bookmark to a webpage and to display content in tabbed main windows;
receiving a request to install to the computing device a web application corresponding to a content identifier in the tabbed main window;
in response to the request, installing the web application on the computing device and adding a user interface element including a visual icon representing the web application as a native application on the computing device;
receiving an interaction with the user interface element representing the web application; and
in response to the interaction, launching the web application in a tabless main window of the browser, the tabless main window lacking a location bar that includes an identifier of an origin of the web application.

2. The method of claim 1, wherein the web application executes as a first task distinct from the browser displaying the content in the tabbed main windows, which executes as a second task, and wherein the first task is presented in a task manager with the visual icon and the second task is presented in the task manager with an icon for the browser.

3. The method of claim 1, wherein the web application installed on the computing device has access to a local resource of the computing device that a version of the web application hosted by a server and accessed via a tabbed main window of the browser lacks access to.

4. The method of claim 1, wherein adding the user interface element includes adding the visual icon to a desktop of the computing device.

5. The method of claim 1, wherein the tabless main window includes a back button and a forward button that are configured to be interacted with to navigate a history of content viewed by a user in the tabless main window of the browser.

6. The method of claim 1, wherein the tabless main window lacks a user interface element configured to be interacted with to store a bookmark to a webpage.

7. The method of claim 1, wherein the web application includes a manifest.

8. The method of claim 1, wherein the request is received via interaction with a menu option.

9. A computing device comprising:
a processor; and
a memory storing instructions that, when executed by the processor, cause the computing device to perform operations including:
opening a tabbed main window of a browser on the computing device, the browser being configured to store a bookmark to a webpage and to display content in tabbed main windows;
receiving a request to install to the computing device a web application corresponding to a content identifier in the tabbed main window;
in response to the request, installing the web application on the computing device and adding a user interface element including a visual icon representing the web application as a native application on the computing device;
receiving an interaction with the user interface element representing the web application; and
in response to the interaction, launching the web application in a tabless main window of the browser, the tabless main window lacking a location bar that includes an identifier of an origin of the web application.

10. The computing device of claim 9, wherein the web application executes as a first task distinct from the browser displaying the content in the tabbed main windows, which executes as a second task, and wherein the first task is presented in a task manager with the visual icon and the second task is presented in the task manager with an icon for the browser.

11. The computing device of claim 9, wherein the web application installed on the computing device has access to a local resource of the computing device that a version of the web application hosted by a server and accessed via a tabbed main window of the browser lacks access to.

12. The computing device of claim 9, wherein adding the user interface element includes adding the visual icon to a desktop of the computing device.

13. The computing device of claim 9, wherein the tabless main window includes a back button and a forward button that are configured to be interacted with to navigate a history of content viewed by a user in the tabless main window of the browser.

14. The computing device of claim 9, wherein the tabless main window lacks a user interface element configured to be interacted with to store a bookmark to a webpage.

15. The computing device of claim 9, wherein the web application includes a manifest.

16. The computing device of claim 9, wherein the request is received via interaction with a menu option.

17. A non-transitory computer-readable medium storing instructions that, when executed by a processor of a computing device, cause the computing device to perform operations comprising:
opening a tabbed main window of a browser on a computing device, the browser being configured to store a bookmark to a webpage and to display content in tabbed main windows;
receiving a request to install to the computing device a web application corresponding to a content identifier in the tabbed main window;
in response to the request, installing the web application on the computing device and adding a user interface element including a visual icon representing the web application as a native application on the computing device;
receiving an interaction with the user interface element representing the web application; and
in response to the interaction, launching the web application in a tabless main window of the browser, the tabless main window lacking a location bar that includes an identifier of an origin of the web application.

18. The non-transitory computer-readable medium of claim 17, wherein the web application executes as a first task distinct from the browser displaying the content in the tabbed main windows, which executes as a second task, and wherein the first task is presented in a task manager with the visual icon and the second task is presented in the task manager with an icon for the browser.

19. The non-transitory computer-readable medium of claim 17, wherein the web application installed on the computing device has access to a local resource of the computing device that a version of the web application hosted by a server and accessed via a tabbed main window of the browser lacks access to.

20. The non-transitory computer-readable medium of claim 17, wherein adding the user interface element includes adding the visual icon to a desktop of the computing device.

21. The non-transitory computer-readable medium of claim 17, wherein the interaction with the user interface element is selection of the user interface element.

* * * * *